United States Patent [19]

Larson

[11] Patent Number: 4,843,561
[45] Date of Patent: Jun. 27, 1989

[54] APPARATUS FOR LOCATING AND MANIPULATING AGRICULTURAL PRODUCTS

[75] Inventor: Bernard R. Larson, Spring Lake, Mich.

[73] Assignee: Sun Controls Design, Inc., Grand Haven, Mich.

[21] Appl. No.: 729,409

[22] Filed: May 1, 1985

[51] Int. Cl.⁴ .................. G06F 15/64; H04N 7/18; B07C 5/342
[52] U.S. Cl. .................... 364/478; 209/587; 358/113; 364/513; 364/424.07; 901/47
[58] Field of Search ............. 364/551, 513, 559, 456, 364/478; 250/202; 356/51, 376; 382/25, 28, 62, 65; 901/1, 9, 46, 47; 56/10.2, 327 R, 327 A, 328 R; 358/96, 101, 107, 113; 209/577, 587, 582

[56] References Cited

U.S. PATENT DOCUMENTS

| | | | |
|---|---|---|---|
| 4,026,656 | 5/1977 | Kusz et al. | 356/51 |
| 4,146,924 | 3/1979 | Birk et al. | 364/513 |
| 4,204,950 | 5/1980 | Burford, Jr. | 209/582 |
| 4,396,945 | 8/1983 | Di Matteo et al. | 358/107 |
| 4,425,751 | 1/1984 | Bousseau | 56/327 A |
| 4,437,114 | 3/1984 | La Russa | 401/9 |
| 4,462,046 | 7/1984 | Spight | 358/101 |
| 4,482,960 | 11/1984 | Pryor | 364/456 |
| 4,500,970 | 2/1985 | Daemmer | 364/461 |
| 4,532,757 | 8/1985 | Tutle | 56/328 R |
| 4,534,470 | 8/1985 | Mills | 209/587 |
| 4,558,786 | 12/1985 | Lane | 209/577 |
| 4,608,599 | 8/1986 | Kaneko et al. | 358/96 |

Primary Examiner—Felix D. Gruber
Attorney, Agent, or Firm—Waters, Morse & Harrington

[57] ABSTRACT

Apparatus for locating and manipulating agricultural products such as fruits and vegetables that emit or reflect distinctive radiation in a predetermined non-visible frequency range comprises a detection means for detecting and producing digitized images of the products based upon the non-visible radiation in the predetermined frequency range received from a given viewing area. A product locator mechanism receives the digitized images as input, compares the characteristics of the digitized input with a predetermined digitized definition of products to be selected, and generates an output signal usable for directing an output device relative to the produces. The product locator compares discrete peripheral coordinate points on the infrared and visual images with points on a mathematical curve conforming with the product outline as one means to indicate the presence of a product. A separate central processing unit controls a motion control device for picking the fruits or vegetables located.

14 Claims, 6 Drawing Sheets

APPARATUS FOR LOCATING AND MANIPULATING AGRICULTURAL PRODUCTS

BACKGROUND OF THE INVENTION

This invention relates to apparatus for locating and manipulating agricultural products and more particularly to a system for electronically locating products by means of a digitized image signal and picking or otherwise manipulating the product in response to the signal.

Most agricultural products are either picked by hand or picked by a machine that clear strips the field, harvesting the plant as well as the fruit or vegetable and limiting the field to a single harvest per growing season. While hand labor can be employed to pick fruits or vegetables on more than one occasion from a given plant, hand labor has its own problems with cost, availability, and reliability of labor.

A machine that is capable of picking fruits or vegetables from plants without destroying the plant is desirable.

Robotic picking devices are not commonly used in the agricultural industry, although robotic manipulators have been used in relatively large scale in manufacturing assembly lines to perform simple tasks such as loading and unloading machines, stacking parts, spray painting and spot welding. These machines generally respond to a set of highly specific program commands wherein the positioning and orientation of the work pieces manipulated are known with considerable precision. The programming of such a manipulator is relatively complicated and the program is useful only if the positioning of the work pieces is held within relatively precise tolerances.

Some attempts have been made to increase the flexibility of such industrial manipulators by the addition of various sensory capabilities. Tactile and auditory capabilities are presently being developed. Additionally, visual capabilities are being developed. Range finding, structured light, and binocular vision techniques have been employed to produce robotic vision systems. However, these systems are not particularly successful in applications requiring identification, location, and orientation of similarily colored objects in a field of vision. Further, the known visual light techniques for vision region analysis require substantial processing time.

A primary object of the present invention is to provide a system that automatically locates an agricultural product and directs a mechanical manipulating device to manipulate the product in some desired manner. Two areas in which the invention is particularly applicable are in the picking of fruits and vegetables in the field and in sorting fruits and vegetables from a conveyor belt or the like in order to eliminate spoiled or rotten fruit.

SUMMARY OF THE INVENTION

In accordance with the present invention, apparatus for locating agricultural products such as fruits or vegetables or the like, wherein the products emit or reflect distinctive radiation characteristics in a nonvisible frequency range, comprises a detection means for detecting and producing digitized images of the products based on nonvisible radiation in a predetermined frequency range received from a given viewing area, the radiation being in a frequency range that includes the distinctive frequency range for the product to be located. A product locator or analyzer mechanism receives the digitized images as input, compares the characteristics of the digitized input with a predetermined digitized definition of products to be selected, identifies the products conforming to the definition, and generates an output signal usable for directing an output device relative to the products.

In the present invention, the detection mechanism comprises a combination of a visual light camera or imaging device and an infrared imaging device. The visual light imaging device senses and produces a digitized image corresponding to visual light of a wave length of 100–1000 nanometers. The infrared imaging device produces a digitized image signal in the infrared range of a wave length of 1000–2000 nanometers. An analyzing unit, preferably a central processing unit (CPU) of a computer, compares the visual and infrared signals with known characteristics of the shape of the product. Preferably, the CPU also analyzes the total area of a set energy level representative of the product. When there is a match of more than one of the three product characteristics a "pick" signal is generated and transmitted to a motion control mechanism that controls by its own CPU the manipulation of a robot arm. The robot arm is directed toward the product, picks it, and places it on a conveyor belt or the like.

When the product being picked is a pickle (which has an ellipsoid shape) or other fruit or vegetable having a characteristic peripheral shape, the shape of a pickle is detected by analyzing the peripheral shape of the product for compliance with three points on a mathematical curve representative of the shape of the product (e.g., an ellipsoid). This provides a relatively simple shape detection mechanism.

It is important that the optical viewing imaging devices of the present invention maintain a clear line of sight to the products. In field conditions, dirt and mud could obscure the vision of the imaging devices. To avoid this, a novel wiper system has been developed. This mechanism comprises a wiper system wherein wiper blades are mounted in the back of individual blades or leaves of an iris-type device positioned adjacent the outer surface of the lens, with the blades wiping the lens clean as the iris opens and closes. A sprayer to wash the lens also is used.

The robot arm mechanism of the present invention provides quick and accurate response over a wide picking area.

These and other features and advantages of the present invention are shown in more detail in connection with the preferred embodiments of the present invention described below and shown in the appended drawings.

DETAILED DESCRIPTION OF THE PREFERRED EMBODIMENT

Figure 1:
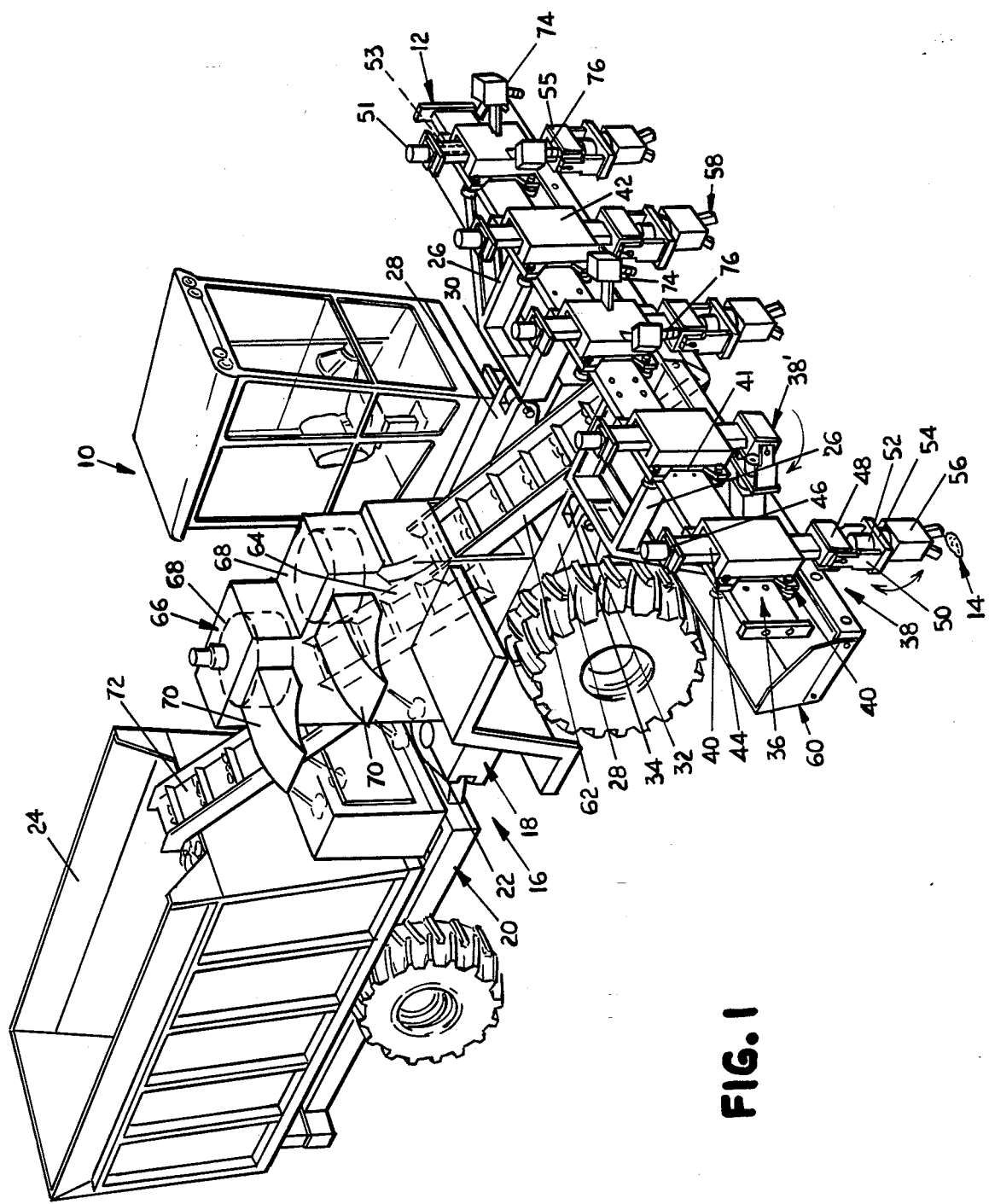
FIG. 1 is a perspective view of a harvester for pickles or the like employing the robotic pick-up mechanism of the present invention.
Figure 2:
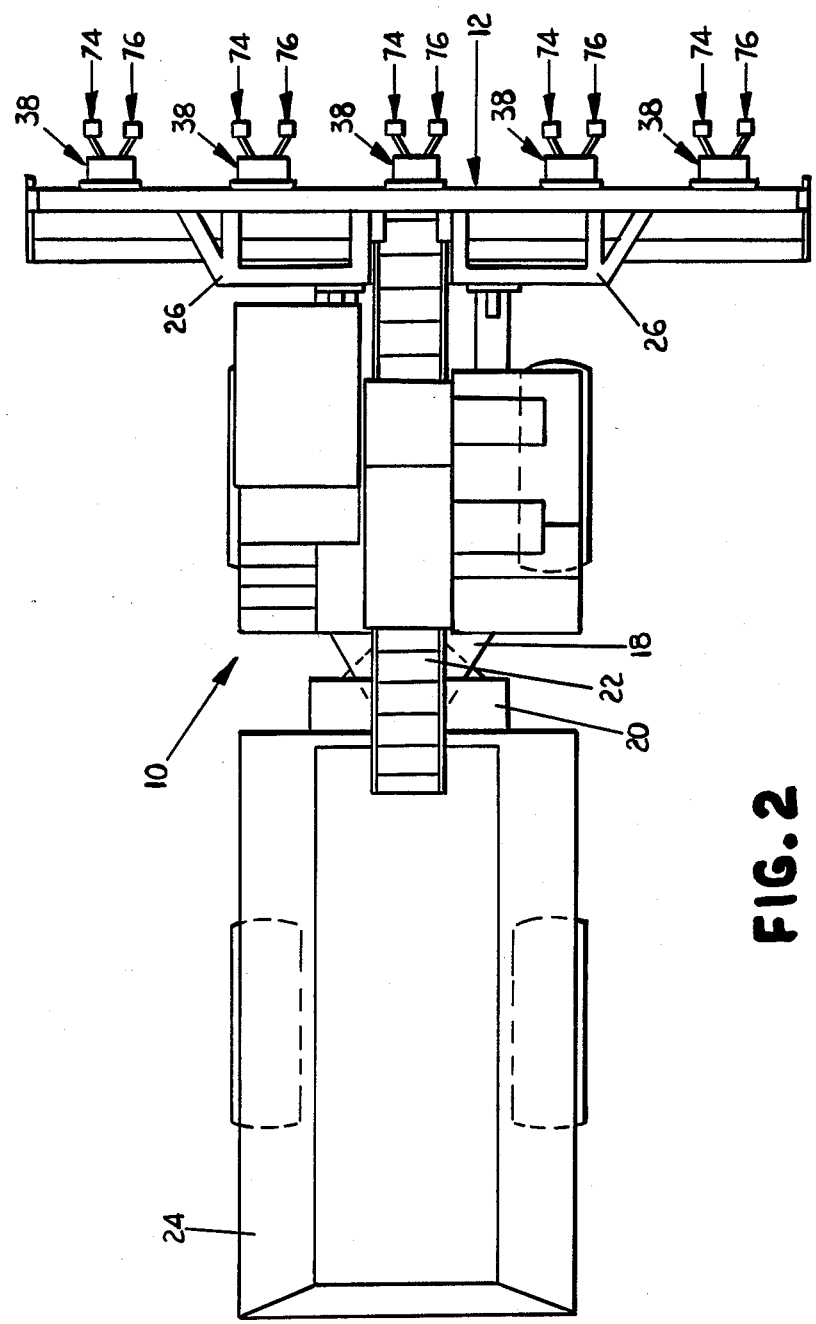
FIG. 2 is a plan view of the machine shown in FIG. 1.

In accordance with the present invention, a harvester 10, as shown in FIG. 1, employs a robotic pick-up mechanism 12 constructed in accordance with the present invention for harvesting pickles 14 or other agricultural products.

Harvester 10 comprises an articulated chassis 16 having a front portion 18 and a rear portion 20 with a pivoting joint 22 in between. The rear portion of the chassis has a hopper 24 mounted thereon for collecting agricultural products after they are harvested. For convenience the products described herein will be pickling cucumbers or pickles. Pick-up mechanism 12 is mounted on the front end of the chassis by mounting brackets 26 pivotally attached to forwardly extending arms 28 on the chassis. Mounting brackets 26 are attached to arms 28 for vertical pivotal movement by means of horizontal pivot pins 30 extending through forwardly extending flanges 32 on the arms and through rearwardly extending flanges 34 on the mounting brackets 26. This permits upward and downward adjustment of the picking mechanism.

The apparatus includes two mounting brackets 26, with each mounting bracket comprising a U-shaped member attached to one of the arms 28. The outer ends of the U-shaped members are attached to a transverse mounting beam 36 which has upper and lower edges.

In the FIG. 1 embodiment, five identical pick-up heads 38 are mounted on the transverse mounting beam by rollers 40 at the top and bottom edges of the beam. The rollers are attached to a mounting plate 41 positioned on the front side of the mounting beam so that they engage both sides of the beam and capture the mounting plate firmly on the beam for transverse movement.

A rectangular channel member 42 is mounted on the front of the mounting plate with a vertical rectangular opening therethrough. A rectangular shaft 44 having V-shaped side edges extends through this vertical opening and rides on cam followers rotatably mounted adjacent each side edge. Vertical movement of the shaft is controlled by a vertical rack gear on the shaft that engages a motor driven pinion gear (see FIGS. 4 and 5). A stop mechanism 46 on the top of the shaft limits downward movement of the shaft through the channel member. The lower end of the shaft 44 is connected to a base 48. Pivot arms 50 are pivotally attached on each side of base 48 for pivotal movement in a rearward upward direction as shown by the position of pick-up unit 38' in FIG. 1. A pivot drive unit 51 is mounted on the top of shaft 44 and is connected to a vertical shaft 53 that extends downwardly through an open interior section in shaft 44. The lower end of shaft 53 is connected to a gear box 55, which in turn is drivingly attached to pivot arms 50. Rotation of shaft 53 by drive motor 51 engages the gear box and causes pivotal movement of arms 50.

The outer ends of pivot arms 50 are attached to a mounting plate 54 for the pick-up head 56. Rotation drive unit 52 is mounted on the mounting plate and controls rotational movement of the pick-up head. Pick-up head 56 includes a pair of closable gripping fingers 58 that can be opened or closed as desired by means of an internal drive mechanism. Drive unit 52 can rotate the robot head to adjust the position of the robot fingers in order to be properly aligned with the side of a pickle.

Positioned under frame 26 and immediately behind the pick-up head of the pick-up mechanism is a transverse conveyor 60 which is positioned to receive pickles from the pick-up heads when they are pivoted rearwardly. Transverse conveyor 60 conveys the pickles to an elevator conveyor 62, which conveys the pickles to another elevator conveyor 64. This conveyor is located inside the housing 66 of exhaust fans 68, which remove debris from the pickles and discharge it from outlet hoods 70. The pickles are then conveyed to a third elevator conveyor 72 and are deposited from there into hopper 24.

Pickles are located for the robotic pick-up by means of a visual imaging device 74 and an infrared imaging device 76, both mounted on the front side of channel member 42 of each pick-up mechanism. The imaging devices locate and determine the orientation of pickles in the manner described below and cause a control signal to be transmitted to operate the pick-up heads. In response to this control signal, the robotic pick-up fingers move into position to pick up the pickle, rotate to be in proper alignment with the sides of the pickle, close on the pickle, pivot rearwardly to place the pickle over the conveyor, and then drop the pickle on to the conveyor.

Figure 3:
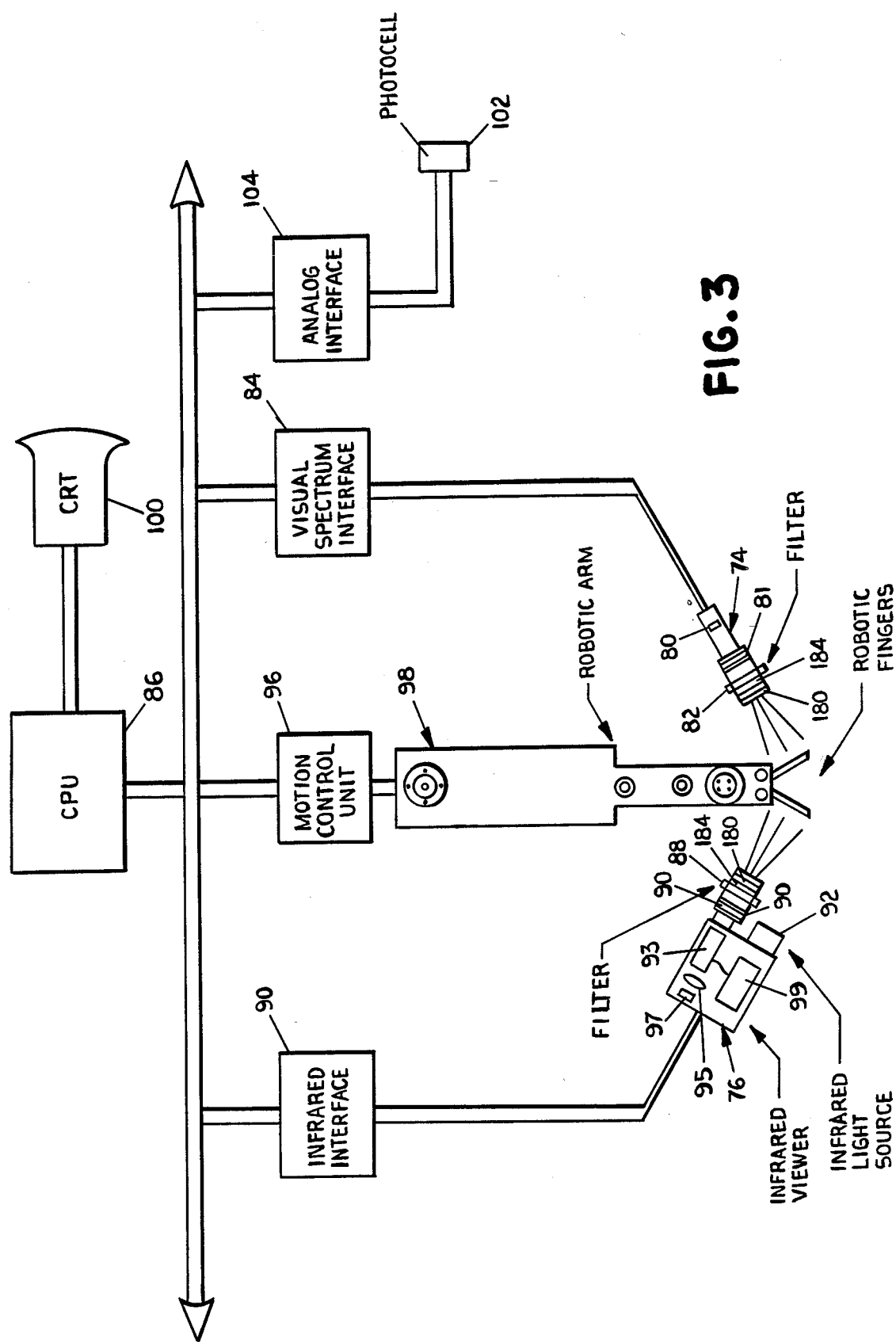
FIG. 3 is a block diagram of the digital control circuits of the present invention.

The detection mechanism by which pickles are located is a very important feature of the present invention and is shown in more detail in FIG. 3. Visual imaging device 74 is a digitizing visual imaging device comprising a lens 81 and an image sensor 80 capable of sensing radiation in the visual spectrum of approximately 100–1000 nm. (nanometers). There are a number of available sensors that can accomplish this purpose, such as charge coupled devices (CCDs), photodiodes in a linear array, or vidicon tubes. A preferred sensor is a device called an "Optic RAM" chip, which is a brand name for a type of photodiode linear array that accesses like a dynamic ram. An Optic RAM chip is responsive to visible radiation in the 100–1000 nm. range. When placed in a conventional camera mechanism the Optic RAM chip converts the focused visual image in the camera directly to a digitized signal. In the preferred practice of the present invention digital image chip 80 is an IS32 Optic RAM chip available from Micron Technology, Inc., Boise, Id.

Even more effective digitized image sensors have been and are being developed. For example an HCMOS gate array is a $512 \times 512$ array (as opposed to the $512 \times 128$ of the Optic RAM) and has a lower gate delay than an Optic RAM.

The image received by the visual camera can be enhanced by the use of appropriate filters 82 that serve to emphasize the visual distinctiveness of the particular agricultural product being picked. For example, a filter that eliminates yellow and brown colors effectively eliminates dirt and yellow vegetation from the visual field, emphasizing the visual distinctiveness of a green pickle.

The Optic RAM chip produces a digital output directly and this digitized image is transmitted through a visual spectrum interface 84 to a central processing unit (CPU) 86 wherein the image is processed and analyzed. The software program in the central processing unit or analyzer 86 contains a digitized definition of the agricultral product that the camera mechanism is looking for. In the case of a pickle, the perimeter meets certain geometric criteria and is generally in the shape of an ellipsoid. The CPU analyzes the perimeter of the pickle detected by the camera in order to determine if three specified points on the perimeter match coordinate points on a curve fitting the equation for an ellipsoid. If a match is found, then a status bit is set as "PICK1." If no object is match is found, a status bit "NOPICK1" is set in the processor. In either case, the image detected by the visual camera is not conclusive as to the presence or absence of a pickle in the field of vision.

The same scene is viewed by the infrared viewer or imaging unit 76. The imaging unit 76 (FIG. 3) comprises a lens 90 that receives radiation and transmits it through a filter 88 that eliminates the visible radiation from the signal (i.e., all radiation under about 1000 nm.) The filtered signal then passes through an infrared image intensifier tube 93 (which is powered by a power supply 99) that amplifies the signal and converts the infrared radiation to radiation in the visible spectrum, to which the Optic RAM is sensitive. The converted signal is then transmitted to a visual image digitizer comprising a lens 95 and an Optic RAM chip 97 substantially in the same manner as in the visual light digitizer 74.

It is an important aspect to the present invention that growing fruits and vegetables have distinctive infrared radiation characteristics when compared to the ground and the surrounding vegetation. Growing fruits and vegetables both emit and reflect infrared radiation to a greater degree than the surrounding vegetation or ground. Thus, when viewed by a infrared detector, fruits and vegetables can be detected even though they may be behind leaves or other vegetation. Thus while a vision camera may be fooled by the shape of a leaf or the presence of the leaf in front of the fruit, the infrared detector is not fooled by the camouflage and easily detects the presence of the product, ignoring the vegetation that makes the product not visible to ordinary sight. The distinctive range is about 1000-2000 nm.

To enhance the infrared image detected by the infrared camera, the infrared viewer desirably includes an infrared light source 92 that shines on the given viewing area. While the light source might not be absolutely essential in all circumstances, it does improve the effectiveness of the unit.

Digitized images received by the infrared viewer are transmitted through an infrared interface 94 to the central processing unit. There, the digitized image is compared with digitized characteristics of the product in order to determine if a product is present.

One aspect of the infrared analysis is the same as the visual analysis. An inspection is made of the perimeter of the object in order to see if there is a match of three coordinate points in a curve fitting the equation for the outline of the pickle or other product. If a match is found, a status bit "PICK2" is generated.

The infrared image also is analyzed for the total area of a set energy level in comparison with the energy level of the surrounding vegetation. Since the energy level of a fruit or vegetable is substantially higher than the surrounding vegetation, an energy difference is apparent. If there is a match on the total area at the set energy level, a status bit "PICK3" is set.

If any two of the three status bits is positive, the processor concludes that a product is present. The processor can then proceed to calculate the specific location of the fruit or vegetable by determining the centroid of the product based on the coordinate points matched and then can generate an output signal to a motion control unit 96 that controls the movement and operation of the robot arm 98. Motion control unit 96 includes its own CPU, which is separate from the analyzer CPU 86. The use of a separate CPU for controlling motion improves the speed of operation of the unit and is an important feature of the invention. Visual output of the processor functions can be viewed by means of a cathode ray tube 100.

An important feature of the present invention is the manner in which the image detectors operate in connection with the robot arm. The image detectors desirably are positioned in a fixed position with respect to the robot arm so that they view a specific viewing area in relation to the position of the robot arm. This viewing area may be directly below the robot arm or somewhat in front of the robot arm or otherwise as a particular application mandates. The imaging devices in effect operate by taking snapshots of successive scenes as the apparatus is moved through the field. Each scene is processed and analyzed separately, and the robot arm is directed to any fruit or vegetable that may be located in that particular scene. If no product is located in the given viewing area, the imaging devices then proceed to receive a data image from the next successive scene.

One aspect of the present invention contemplates that the processor will not only identify the existence of a product within the given viewing area or scene but it will also determine the location and orientation of the product within the scene. The motion control unit can then move the robot arm and orient the pick-up fingers so that they pick up the pickle properly.

A simplified and still effective mechanism employs a robot arm that can pick up a pickle no matter where it is oriented. If the robot fingers are wide enough and the viewing area is small enough, the robot arm is able to pick up any product that is located within the viewing area. Similarily, since a pickle is generally lying on the ground, it is not essential to regulate the stroke or the downward movement of the robot arm. Instead, one can provide a consistent robot arm movement of the same distance. A simplified mechanism of this manner eliminates a significant amount of the processing required and mechanical movements of the robot arm.

In order to provide a relatively uniform input signal strength for comparative purposes, the apparatus also can employ a photocell 102 that detects the ambient light level in the scene. This information is transmitted through an analog interface 104 to the CPU so that there is a constant adjustment of sensitivity of the equipment to the ambient light level.

Figure 4:
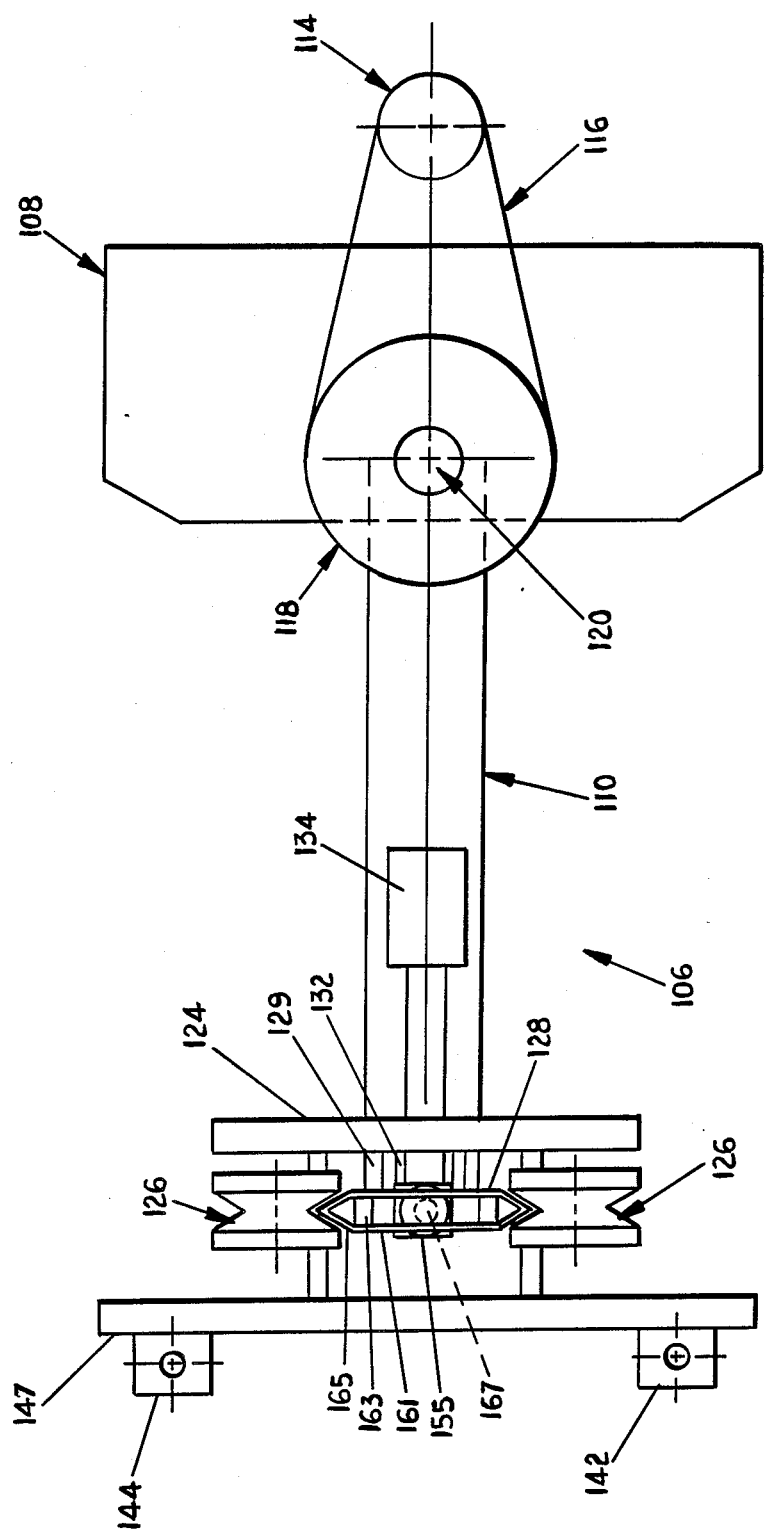
FIG. 4 is a plan view of a simplified harvester for agricultural products employing a single picking arm that pivots backwardly and forwardly.
Figure 5:
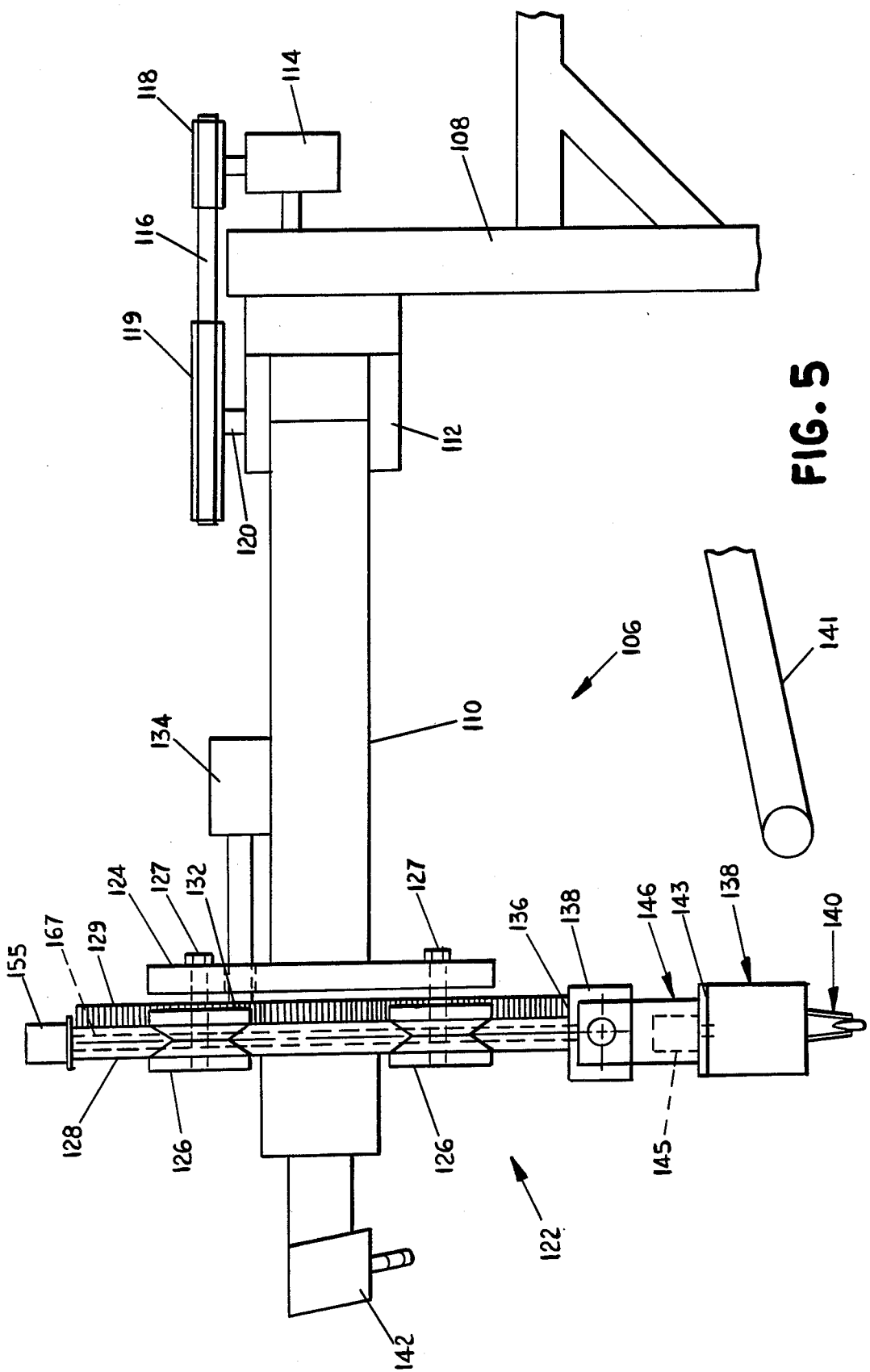
FIG. 5 is a side elevational view of the harvester of FIG. 4.
Figure 8:
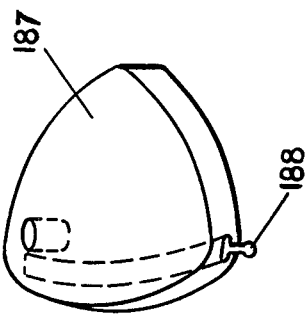
FIG. 8 is a perspective view of one leaf of the iris-type lens wiper of the present invention.
Figure 7:
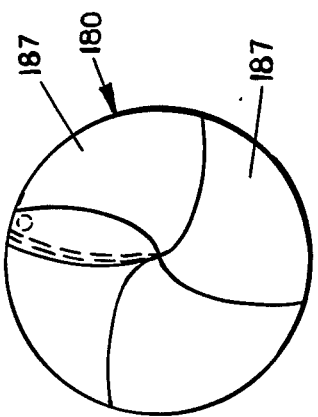
FIG. 7 is a view taken along line 7—7 of FIG. 6.

Another embodiment of the present invention is shown in FIGS. 4 and 5. This embodiment comprises a single arm harvester 106 that is mounted on the front end of a tractor frame 108. Harvester 106 comprises an arm 110 pivotally mounted to the tractor at a rear end by pivotal mounting mechanism 112 so that it can pivot from side to side. The position of the arm is controlled by hydraulic motor 114 connected to the arm by means of a belt drive 116 and pulleys 118 and 119. Pulley 119 is connected to a shaft 120 that is attached to arm 110.

A pick-up mechanism 122 of similar design to pick-up heads 38 is mounted at the outer end of arm 110. Pick-up mechanism 122 comprises a mounting plate 124, with vertically oriented cam followers 126 spaced horizontally apart and mounted on the front of the plate by axles 127. A flat vertical shaft 128 with V-shaped outer side edges is positioned on the front of plate 124 and is constrained for vertical movement by cam followers 126 that bear against opposite sides of the shaft. Shaft 128 comprises a pair of flat plates 161 mounted on opposite sides of a pair of spaced square tubes 163, with V-shaped members 165 attached to the outer sides of the tubes. Shaft 128 has a vertical rack gear 129 running along the rear side of the shaft. This rack gear engages pinion gear 132, which is driven by hydraulic motor 134. Hydraulic motor 134 is reversible so that it can move shaft 128 up and down by means of the rack and pinion gear assembly.

A base 136 housing a gear box 139 is mounted at the lower end of shaft 128. Spaced pivot arms 146 are mounted on the output shaft of the gear box. The pivot arms extend downwardly and are attached to a mounting plate 143 for a robot gripper mechanism 138. A pivot drive motor 155 is mounted on the top of shaft 128 and rotates a drive shaft 167 that extends downwardly through the hollow interior of shaft 128. Drive shaft 167 engages gear box 139 to pivot the gripper mechanism upwardly and inwardly. The gripper mechanism also can be rotated about a vertical axis with respect to the mounting plate 143 by means of a pivot drive motor 145 mounted on the mounting plate. Robot gripper fingers 140 are positioned on the bottom of the gripper assembly and are opened and closed by the gripper mechanism to pick up fruits or vegetables.

A vision imaging device 142 and an infrared imaging device 144 substantially as described above are mounted on opposite sides of the pick-up mechanism on a transverse imaging device mounting beam 147, which is in turn attached to mounting plate 124. The imaging devices are positioned so that they view the area immediately under or just in front of the gripper mechanism. The electronics are the same as described above.

The operation of this embodiment of the invention is as follows: as the tractor moves through the field, the arm 110 is oscillated sideways in discrete steps. At each step, the imaging devices view the scene or viewing area and transmit digitized images to the central processing unit for comparison with known identities of products that are being looked for. If there is a match of two of three identifying criteria, a match is found and the hydraulic motor 134 is actuated to lower the gripper mechanism. The gripper mechanism 138 is rotated by motor 145 to and gripper fingers 140 are opened and closed on the fruit or vegetable by the gripper mechanism. A conveyor mechanism 141 of the same general type employed for FIG. 1 is used to convey pickles rearwardly from the pick-up mechanism in this apparatus.

If a product is located at a given viewing area, the product is picked up and deposited on the conveyor. If no product is located, the arm moves to the next discrete viewing area and the same process is repeated. If a product has been found, the process is repeated as soon as the pickle has been picked and deposited on the conveyor.

Figure 6:
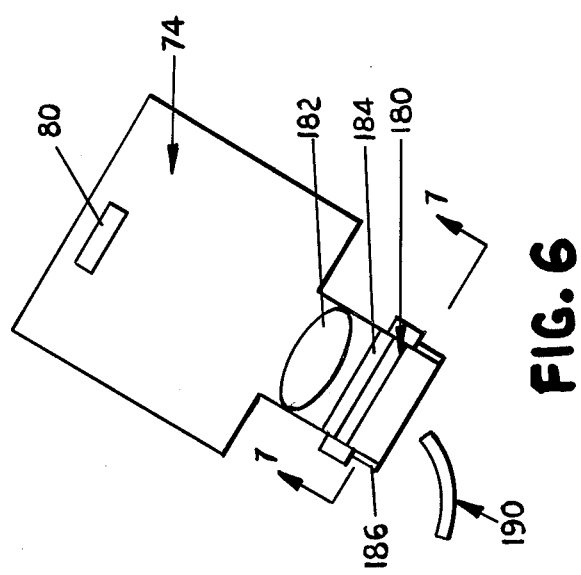
FIG. 6 is an enlarged schematic view of the imaging device and lens wiper of the present invention.

Another feature of the present invention is a wiper mechanism 180 employed to keep the camera lens free of dirt and debris even under dirty field conditions. As shown schematically in FIG. 6, camera lens 182, which is conventional, is sealed behind flat glass 184 mounted in the barrel 186 of the camera. The lens wiper 180 is mounted adjacent the outer surface of the glass. Lens wiper 180 comprises an iris-type device comprising a plurality of radially spaced leaves 187 that are shaped and pivotally mounted in a conventional manner to open and close over the glass. The edges of the leaves are fitted with individual flexible wiper blades 188 formed of rubber or plastic. The wiper blades have T-shaped portions that fit in T-shaped slots in the leaves, with a wiping portion protruding out of the slot. As the leaves are opened and closed the blades in the leaves press against wipe clean the glass. A sprayer mechanism 190 positioned outside the lens opening can be actuated to spray a cleaning solution on the lens prior to wiping.

Desirably the digitized image sensor is employed to automatically actuate the wiping mechanism. Periodically (such as every 100 cycles) the sensitivity of the sensor is increased so as to focus on the lens. If dirt specks are noted, a control signal acutates the wipers.

The apparatus for locating agricultural products is described herein in connection with a pickle picking apparatus. It should be understood, however, that the apparatus is not limited to such use and could be used for picking any type of fruit or vegetable wherein the fruit or vegetable exhibits a distinctive infrared pattern.

Also while the use of visual and infrared imaging devices provides important verification and accuracy advantages elimination of a visual spectrum imaging device is possible under some circumstances.

It is also possible to use the apparatus for other types of applications wherein fruits or vegetables are being located. As indicated above, it is possible to use the same basic system to sort vegetables after they have been picked as they pass along a conveyor belt. Fruits or vegetables that are diseased can emit or reflect radiation in a different distinctive frequency pattern than healthy fruits and vegetables. Once the difference in the frequency pattern is determined, a detection system sensitive to the particular frequency involved can be employed to create a digital image of the diseased or affected product. A robot gripper can then be directed to pick the product up and remove it from the collection of healthy fruit.

It should be understood that the foregoing is merely exemplary of the preferred practice of the present invention and that various changes and modifications may be made in the details and arrangements of construction of the elements described herein without departing from the spirit and scope of the present invention.

What is claimed is:

1. Apparatus for manipulating agricultural products such as fruits and vegetables, wherein the products emit or reflect distinctive radiation characteristics in the infrared spectrum comprising:

visual radiation detection means for detecting and generating a digitized visible image signal based on visual radiation, which is about 100 to 1000 nanometers, received from a given viewing area;

infrared detection means for detecting and generating a digitized infrared image signal based on infrared radiation in the range of about 1000 to 2000 nanometers received from a given viewing area; and analyzer means for analyzing the digitized image signals and comparing selected characteristics of the signals with known stored characteristics that are distinctive of the products in the respective visual and infrared frequency ranges, the analyzer means generating a control signal capable of operating a digitized manipulating device whenever a predetermined number of characteristics are indicative of the presence of a product in the viewing area.

2. Apparatus according to claim 1 wherein the analyzer means compares the shape of the respective infrared and visible images with known shape characteristics of the product by comparing discrete coordinate points on a curve representative of the outer periphery of the product with coordinate points on the outside periphery of the product image.

3. Apparatus according to claim 2 wherein the analyzer means also compares the total area at a set energy level of the infrared image with a known total area of a set energy level representative of the product and generates a control signal representative of the presence of a product when any two of the three comparisons indicate the presence of a product.

4. Apparatus for locating agricultural products such as fruits or vegetables or the like that emit or reflect distinctive radiation characteristics in a non-visible frequency range comprising:
   detection means for dectecting and producing digitized images of the products based on non-visible radiation in a predetermined frequency range received from a given viewing area, the radiation being in a frequency range that includes the frequency range of the distinctive radiation characteristics for the products to be located in relation to surrounding vegetation, the predetermined frequency range being about 1000 to 2000 nanometers; and
   product locator means for receiving the digitized images as input, extracting a stored digitized definition of the products to be selected, comparing characteristics of the digitized input with the stored digitized definition of products to be selected, indentifying the products conforming to the definition, and generating an output signal usable for directing an output device relative to the products.

5. Apparatus according to claim 4 wherein the product locator compares points on the outer periphery of the image detected with discrete coordinate points on a mathematical curve representative of the product and also compares the total area of a set energy level detected with a predetermined total area of a set energy level representative of a product and generates a product recognition signal when at least one of the two criteria is satisfied.

6. Apparatus according to claim 5 wherein the apparatus further comprises visible radiation detection means for detecting and generating a digitized visible image in the range of about 100 to 1000 nanometers from the viewing area, the product locator comparing points on the periphery of the detected visible image with predetermined coordinate points on a mathematical curve representative of the product, the product locator generating a product recognition signal when at least two of the three product identification criteria are satisfied.

7. Apparatus for locating agricultural products such as fruits or vegetables or the like that emit or reflect distinctive radiation characteristics in a non-visible frequency range comprising:
   detection means for detecting and producing digitized images of the products based on non-visible radiation in a predetermined frequency range received from a given viewing area, the radiation being in a frequency range that includes the frequency range of the distinctive radiation characteristics for the products to be located in relation to surrounding vegetation, the detection means comprising an imaging device having a lens, the lens being positioned behind a flat protective glass element, the glass element being cleaned by an iris-type lens wiper positioned adjacent the outer surface of the glass element, the lens wiper including a plurality of radially spaced leaves that open and close over the glass element, a plurality of the leaves having a flexible resilient wiper blade fixed in the side adjacent the glass element and positioned so as to wipe the glass element when the wiper is opened and closed; and
   product locator means for receiving the digitized images as input, extracting a stored digitized definition of the products to be selected, comparing characteristics of the digitized input with the stored digitized definition of products to be selected, identifying the products conforming to the definition, and generating an output signal usable for directing an output device relative to the products.

8. Apparatus according to claim 7 wherein the apparatus further includes sprayer means positioned adjacent the outer surface of the glass element for spraying a cleaning liquid on the glass element.

9. Apparatus according to claim 8 wherein the wiper and sprayer are actuated by a control mechanism, the control mechanism increasing the sensitivity of the imaging device periodically such that the imaging device focuses on the glass element, the control mechanism detecting dirt or debris on the outer surface of the glass element and initiating a spraying and wiping action when a predetermined amount of dirt is detected.

10. Apparatus for locating agricultural products such as fruits or vegetables or the like that emit or reflect distinctive radiation characteristics in a non-visible frequency range comprising:
   detection means for detecting and producing digitized images of the products based on non-visible radiation in a predetermined frequency range received from a given viewing area, the radiation being in a frequency range that includes the frequency range of the distinctive radiation characteristics for the products to be located in relation to surrounding vegetation;
   product locator means for receiving the digitized images as input, extracting a stored digitized definition of the products to be selected, comparing characteristics of the digitized input with the stored digitized definition of products to be selected, identifying the products conforming to the definition, and generating an output signal usable for directing an output device relative to the products; and
   picking means for picking products located in response to the output signal, the picking means including a central processing unit for directing movement of a motor driven gripper mechanism to the location detected by the product locator and manipulating the product with the gripper mechanism, the product locator means comprising its own central processing unit for comparing detected images with know product characteristics and generating a position indicating signal for products that are located.

11. Apparatus according to claim 10 wherein the apparatus is mounted on a motor driven vehicle and the detection means and picking means are constructed to pick predetermined vegetables or fruits as the vehicle is moved over a crop in a field, the detection means being directed to a given viewing area in the field and the picking means being constructed and controlled so as to extend downwardly and pick located products with the gripper mechanism and deposit the products in the vehicle for storage.

12. Apparatus according to claim 11 wherein the picking means comprises:
   a vertically movable shaft mounted adjacent the detector means in the vehicle, the shaft being motor driven to extend and retreat a lower end downwardly and upwardly;
   a vertically pivoting base mounted on the lower end of the shaft;
   motor driven means for pivoting the base;
   the gripper mechanism being attached to the base and including means for opening and closing the gripper mechanism;
   collecting means positioned behind the gripper mechanism for receiving products after being picked by the gripper mechanism and pivoted rearwardly and released; and
   control means for extending the shaft downwardly to the product, closing the gripper mechanism on the product, pivoting the gripper mechanism rearwardly, and depositing the product on the collecting means.

13. Apparatus according to claim 12 and further comprising motor driven rotation drive means for rotating the gripper mechanism with respect to the base to properly position the gripper mechanism to pick up irregularly shaped products.

14. Apparatus according to claim 12 and further comprising a plurality of picking means mounted apart on a transverse beam and being movable along the beam.

* * * * *